(12) United States Patent
Petculescu et al.

(10) Patent No.: US 9,892,143 B2
(45) Date of Patent: Feb. 13, 2018

(54) ASSOCIATION INDEX LINKING CHILD AND PARENT TABLES

(71) Applicant: Microsoft Technology Licensing, LLC, Redmond, WA (US)

(72) Inventors: Cristian Petculescu, Seattle, WA (US); Marius Dumitru, Sammamish, WA (US); Vasile Paraschiv, Redmond, WA (US); Amir Netz, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 444 days.

(21) Appl. No.: 14/614,299

(22) Filed: Feb. 4, 2015

(65) Prior Publication Data
US 2016/0224604 A1 Aug. 4, 2016

(51) Int. Cl.
*G06F 17/30* (2006.01)
(52) U.S. Cl.
CPC .. *G06F 17/30336* (2013.01); *G06F 17/30339* (2013.01); *G06F 17/30371* (2013.01); *G06F 17/30581* (2013.01)
(58) Field of Classification Search
CPC ......... G06F 17/30336; G06F 17/30339; G06F 17/30581; G06F 17/30371
See application file for complete search history.

(56) References Cited

U.S. PATENT DOCUMENTS

| | | | |
|---|---|---|---|
| 5,404,507 A | 4/1995 | Bohm et al. | |
| 5,615,367 A | 3/1997 | Bennett et al. | |
| 6,339,777 B1 | 1/2002 | Attaluri et al. | |
| 6,360,223 B1 | 3/2002 | Ng et al. | |
| 6,980,976 B2 | 12/2005 | Alpha et al. | |
| 7,383,273 B2 | 6/2008 | Wang et al. | |
| 7,725,471 B2 | 5/2010 | Weinberg et al. | |
| 7,730,097 B2 | 6/2010 | Oswalt | |
| 8,086,592 B2 | 12/2011 | Mion et al. | |

(Continued)

FOREIGN PATENT DOCUMENTS

WO 2001008045 A1 2/2001

OTHER PUBLICATIONS

U.S. Appl. No. 14/610,963, filed Jan. 30, 2015, Petculescu et al.
(Continued)

*Primary Examiner* — Richard Bowen
(74) *Attorney, Agent, or Firm* — Workman Nydegger (57) ABSTRACT

The creation and updating of an association index that defines a linking between a child table and a parent table in a database system, and in which each of at least some of the parent table rows have an associated expression defining rules for mapping child table rows to the associated parent table row. The association index may be constructed with one pass of the parent table by evaluating the mapping definition to identifying associated child table rows. If there are such associations for a given parent table row, the linking module may record that association in an association index. If there are changes made that potentially invalidate an association status (whether an association or lack thereof), a re-evaluation module then determines which mapping definitions for which parent rows need to be re-evaluated, and potentially for which child table rows, rather than perform the entire process again.

20 Claims, 8 Drawing Sheets

(56) References Cited

U.S. PATENT DOCUMENTS

| | | | |
|---|---|---|---|
| 8,108,367 B2* | 1/2012 | Konik | G06F 17/3051 706/19 |
| 8,407,180 B1 | 3/2013 | Ramesh et al. | |
| 8,442,999 B2 | 5/2013 | Gorelik et al. | |
| 2002/0194149 A1 | 12/2002 | Gerber et al. | |
| 2004/0186826 A1 | 9/2004 | Choi et al. | |
| 2005/0251526 A1 | 11/2005 | Nayak | |
| 2005/0283485 A1* | 12/2005 | Blaicher | G06F 11/0727 |
| 2005/0283501 A1* | 12/2005 | Blaicher | G06F 17/30595 |
| 2006/0248087 A1 | 11/2006 | Agrawal et al. | |
| 2006/0288024 A1 | 12/2006 | Braica | |
| 2007/0174329 A1* | 7/2007 | Anderson | G06F 17/30306 |
| 2007/0250471 A1 | 10/2007 | Fontoura et al. | |
| 2009/0125530 A1 | 5/2009 | Martinsson et al. | |
| 2009/0198729 A1 | 8/2009 | Gong | |
| 2009/0144295 A1 | 9/2009 | Mion et al. | |
| 2010/0131570 A1 | 5/2010 | Weinberg et al. | |
| 2012/0078950 A1 | 3/2012 | Conrad et al. | |
| 2012/0117067 A1 | 5/2012 | Yakubovich | |
| 2012/0246133 A1 | 9/2012 | Hsu et al. | |
| 2014/0089255 A1 | 3/2014 | Pejathaya et al. | |
| 2014/0172905 A1 | 6/2014 | Konik et al. | |
| 2014/0195542 A1 | 7/2014 | Larson et al. | |
| 2015/0379085 A1 | 12/2015 | Petculescu et al. | |
| 2016/0062997 A1* | 3/2016 | Roussey | G06F 17/3048 707/736 |
| 2016/0224602 A1 | 8/2016 | Petculescu et al. | |

OTHER PUBLICATIONS

"International Search Report and Written Opinion issued in PCT Application No. PCT/US2015/037300", dated Oct. 29, 2015, 10 pages.

"International Search Report and Written Opinion Issued in PCT Application No. PCT/US2016/016032" dated Apr. 29, 2016, 10 Pages.

"Second Written Opinion Issued in PCT Application No. PCT/US2015/037300", dated May 31, 2016, 7 pages.

Office Action dated Jan. 26, 2017 issued in U.S. Appl. No. 14/317,056.

"Second Written Opinion Issued in PCT Application No. PCT/US2016/016032", dated Jan. 20, 2017, 5 Pages.

"International Preliminary Report on Patentability Issued in PCT Application No. PCT/US2016/016032", dated May 3, 2017, 6 Pages.

Chan, et al., "Efficient Filtering of XML Documents with XPath Expressions", In 18th International Conference on Data Engineering, Feb. 26, 2002, 10 pages.

Sadoghi, et al., "Analysis and Optimization for Boolean Expression Indexing", In Journal of ACM Transactions on Database Systems, vol. 38, Issue 2, Jun. 2013, 45 pages.

Ramabhadran, et al., "Prefix Hash Tree an Indexing Data Structure over Distributed Hash Tables", In Proceedings of the 23rd ACM Symposium on Principles of Distributed Computing, Jul. 2004, 10 pages.

"InterSystems Cache Technology Guide", Published on: Jun. 15, 2012 Available at: http://www.intersystems.com/cache/technology/techguide/cache_tech-guide_02.html.

Li, et al., "DBease: Making Databases User friendly and Easily Accessible", In 5th Biennial Conference on Innovative Data Systems Research, Jan. 9, 2011, 12 pages.

Li, et al., "DiHO: A Distributed Higher-Order Association Rule Miner", In Proceedings of the 24th ACM SIGMOND International Conference on Management of Data, Jun. 13, 2005, 9 pages.

"Full-Text Search (SQL Server)", Retrieved on: Nov. 24, 2014 Available at: http://msdn.microsoft.com/en-us/library/ms142571.aspx.

"InterSystems Cache Technology Guide", Published on: Aug. 18, 2012, Available at: http://www.intersystems.com/cache/technology/techguide/cache_tech-guide_02.html.

Zobel, et al., "An Efficient Indexing Technique for Full-Text Database Systems", In Proceedings of the 18th International Conference on Very Large Data Bases, Aug. 23, 1992, 11 pages.

Davis, et al., "Atlas: A Nested Relational Database System for Text Applications", In IEEE Transactions on Knowledge and Data Engineering, vol. 7, Issue 3, Jun. 1995, 17 pages.

"Textual Searches on Database Data Using Microsoft SQL Server 7.0", Published on: Jan. 1999, Available at: http://msdn.microsoft.com/en-us/library/aa226176(v=sql.70).aspx.

"SQL Server Full Text Search", Published on: Apr. 22, 2012, Available at: http://msdn.microsoft.com/en-us/library/ms142571.aspx.

"InterSystems Cache Technology Guide", Published on: Jul. 4, 2014 Available at: http://www.intersystems.com/assets/CacheTechnologyGuide.pdf.

"International Preliminary Report on Patentability Issued in PCT Application No. PCT/US2015/037300", dated Sep. 28, 2016, 8 Pages.

Office Action dated Jul. 13, 2017 cited in U.S. Appl. No. 14/317,056.

Office Action dated Jul. 13, 2017 cited in U.S. Appl. No. 14/610,963.

* cited by examiner

ASSOCIATION INDEX LINKING CHILD AND PARENT TABLES

BACKGROUND

Computing systems and associated networks have revolutionized the way human beings work, play, and communicate. Nearly every aspect of our lives is affected in some way by computing systems. Computing systems are now largely connected to networks and the Internet so as to enable widespread communications. Database technologies are enabled through the use of computing systems. In relational database systems, there are multiple interrelated tables, where the relationships are defined by links between tables.

Often tables are linked such that a field in one table (called the "referencing table" or the "child table") uniquely identifies a row (e.g., a primary key) of another table (called the "referenced table" or the "parent table"). Thus, the foreign key is used to establish and enforce a link between the child and parent tables.

Conventionally, the foreign key of the child table uniquely identifies the row of the parent table through direct equality in which the foreign key is exactly the same as the parent key. In the case of the foreign and primary keys both being text, the foreign key of the child table might also uniquely identify the row of the parent table by containing the text of the primary key of that row. Accordingly, the foreign key of the child table uniquely identifies a row of the parent table by being the same as (or containing in the case of text) the primary key of that row.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In at least some embodiments described herein relate to the creation and updating of an association index that defines a linking between one or more child tables and a parent table in a database system, and in which each of at least some of the parent table rows have an associated expression defining rules for mapping child table rows to the associated parent table row.

In some embodiments, the association index may be constructed with one pass of the parent table. For instance, one parent table row at a time, a linking module may evaluate the mapping definition for that parent table row to identify one or more child table rows that map to the corresponding parent table row. If there are such associations for a given parent table row, the linking module may record that association in an association index. The linking module may do the same for the next parent table row, and the next, until the association index for the parent table is created on a single pass of the parent table. In some embodiments, more than one child table may be available for evaluating associations with the parent table row.

Upon determining that one or more of the recorded association statuses are no longer valid (e.g., through a change in a foreign key of a child table, or perhaps through a change in the mapping definition for a parent table row), rather than perform the entire process again, a re-evaluation module determines which association statuses are invalidated, and leaves the remainder of the associations intact within the association index. The re-evaluation module then determines which mapping definitions for which parent rows need to be evaluated again, and then performs re-evaluation for those mapping definitions, thereby creating new associations between the child table and the parent table, and without having to redo the entire reformulation of the association index.

Thus, the principles described herein allow associations to be constructed between one or more child tables and a parent table of a database system in a single pass of the parent table, and allows the expressions that define the rules for determining which child table row maps to which parent table row to be determined on a per-row basis in the parent table. Furthermore, if something should change in a child table or the parent table, the entire association index need not be reconstructed, thereby allowing dynamic and real-time changes to the child table and parent table without consuming extraordinary processing resources to keep the associations up-to-date.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In at least some embodiments described herein relate to the creation and updating of an association index that defines a linking between one or more child tables and a parent table in a database system, and in which each of at least some of the parent table rows have an associated expression defining rules for mapping child table rows to the associated parent table row.

In some embodiments, the association index may be constructed with one pass of the parent table. For instance, one parent table row at a time, a linking module may evaluate the mapping definition for that parent table row to identify one or more child table rows that map to the corresponding parent table row. If there are such associations for a given parent table row, the linking module may record that association in an association index. The linking module may do the same for the next parent table row, and the next, until the association index for the parent table is created on a single pass of the parent table. In some embodiments, more than one child table may be available for evaluating associations with the parent table row.

Upon determining that one or more of the recorded association statuses are no longer valid (e.g., through a change in a foreign key of a child table, or perhaps through a change in the mapping definition for a parent table row), rather than perform the entire process again, a re-evaluation module determines which association statuses are invalidated, and leaves the remainder of the association statuses intact within the association index. The re-evaluation module then determines which mapping definitions for which parent rows need to be evaluated again, and then performs re-evaluation for those mapping definitions, thereby creating new associations between the child table and the parent table, and without having to redo the entire reformulation of the association index.

Thus, the principles described herein allow associations to be constructed between one or more child tables and a parent table of a database system in a single pass of the parent table, and allows the expressions that define the rules for determining which child table row maps to which parent table row to be determined on a per-row basis in the parent table. Furthermore, if something should change in a child table or the parent table, the entire association index need not be reconstructed, thereby allowing dynamic and real-time changes to the child table and parent table without consuming extraordinary processing resources to keep the associations up-to-date.

Some introductory discussion of a computing system will be described with respect to FIG. 1. Then, embodiments of such expression based association index building and updating will be described with respect to subsequent figures.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
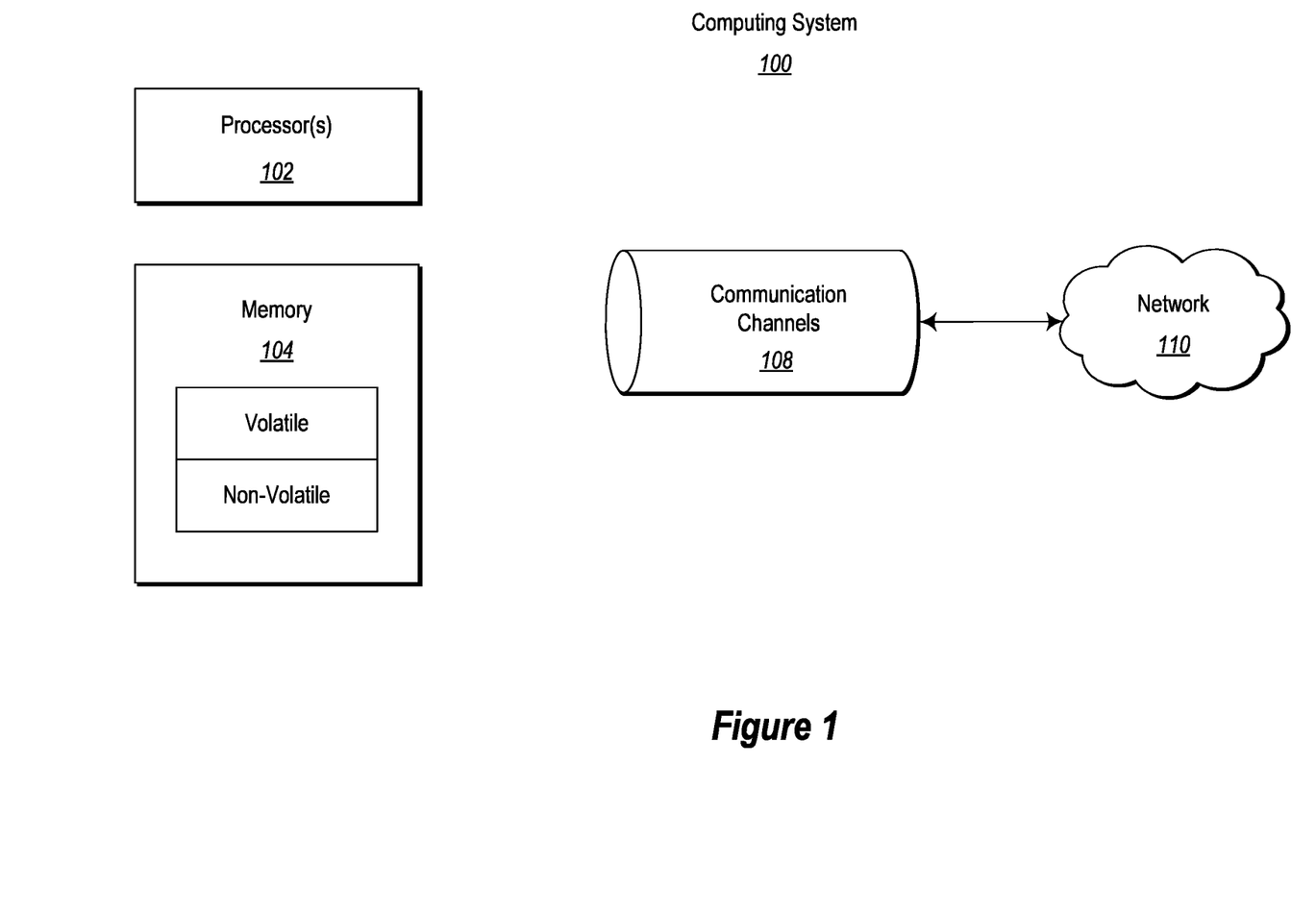
FIG. 1 abstractly illustrates a computing system in which some embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
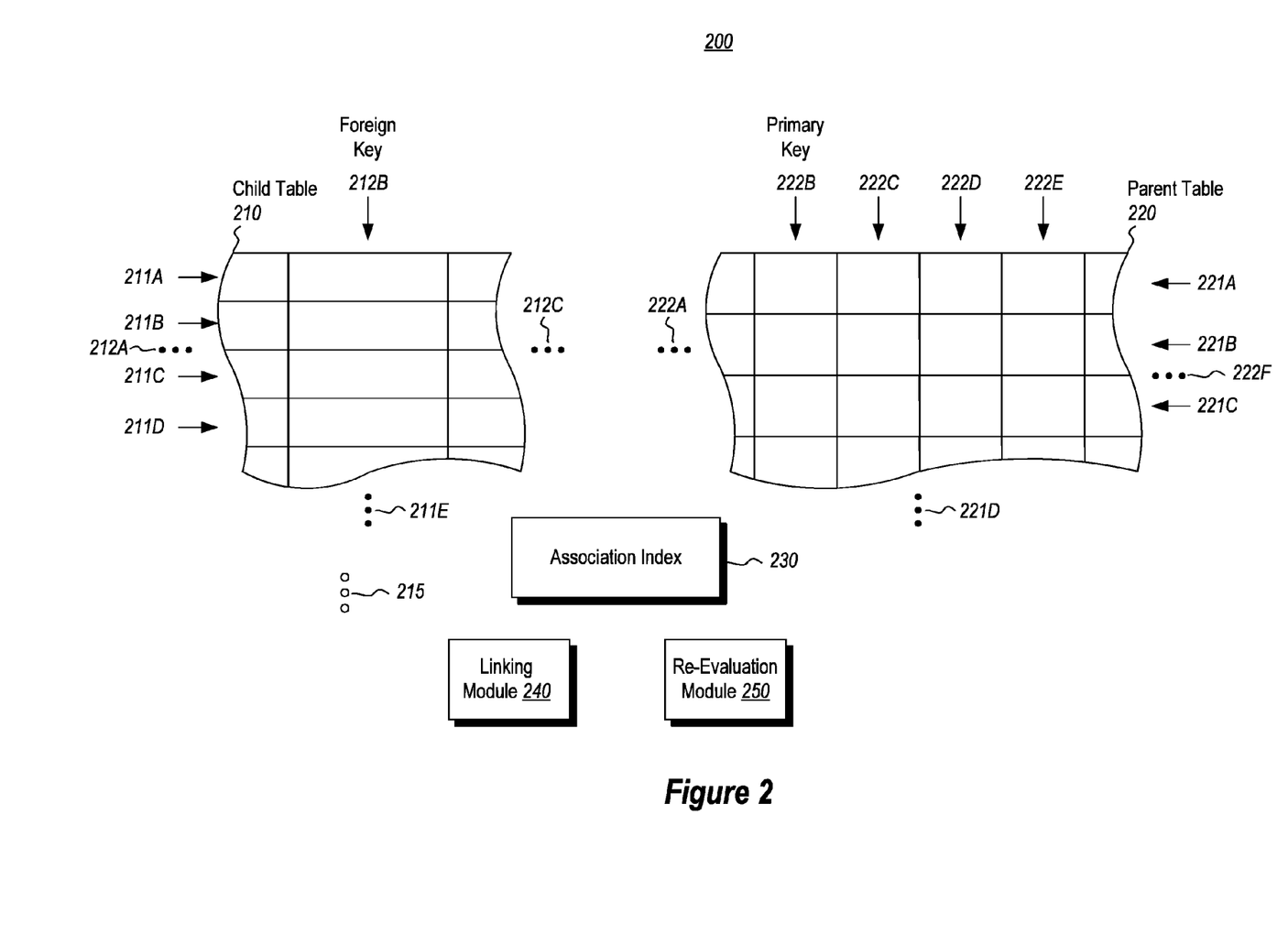
FIG. 2 illustrates a database system in which the principles described herein may operate, and which includes one or more child tables, a parent table, and an association index that records associations between the child table(s) and the parent table.

FIG. 2 illustrates a database system 200 in which the principles described herein may operate. The database environment 200 includes a one or more child tables and a parent table 220. For instance, the child table(s) include the child table 210 amongst potentially one or more other child tables as represented by the ellipses 215. The principles described herein may operate upon any configuration of child table and any configuration of parent table regardless of the number of rows and columns in each, or the values.

For example purposes only, the child table 210 is illustrated as including four rows 211A, 211B, 211C and 211D. However, the ellipses 211E represent that the child table 210 may include any number of rows, even fewer than the four illustrated. For instance, the child table 210 may include as little as a single row, and as many as an enumerable number of rows, and anything in-between. Similarly, the child table 210 is illustrated as including a single column 212B, although the ellipses 212A and 212C represent that the child table 210 may include any number of columns. The column 212B is a foreign key column that includes values (not illustrated concretely) that may be used to uniquely identify a corresponding row in the parent table 220.

For example purposes only, the parent table 220 is illustrated as including three rows 221A, 221B and 221C. However, the ellipses 221D represent that the parent table 220 may include any number of rows, even fewer than the three illustrated. For instance, the parent table 220 may include as little as a single row, and as many as an enumerable number of rows, and anything in-between. Similarly, the parent table 220 is illustrated as including four columns 222B, 222C, 222D and 222E, although the ellipses 222A and 222F represent that the parent table 220 may include any number of columns. The column 222B is a primary key column that includes values (not illustrated concretely in FIG. 2) that may be used to uniquely identify a corresponding row in the parent table 220. Although FIG. 2 is illustrated in abstract form, with no values illustrated, more concrete examples will be described below with respect to FIGS. 4 and 5.

In this description and in the claims, the terms "row" and "column" are used. The term "row" is not restricted to an element that is stacked vertically, and extended horizontally. Furthermore, the term "column" is not restricted to an element that is stacked horizontally, and extended vertically. The manner in which a table is displayed or represented is not important to the principles of the present invention as described herein. The tables described herein are not necessarily tables that are illustrated in a user interface, by a computer-readable form. Accordingly, the terms horizontal and vertical have little meaning in such computer-readable tables. Thus, the terms "rows" and "columns" described herein are merely referring to two distinct dimensions of a computer representation of the table.

In accordance with the principles described herein, associations are made between the child tables and the parent table 220. These associations are recorded in an association index 230. For instance, for each of at least some of the parent rows, there may be one or more corresponding child rows associated with the parent row. In accordance with the principles described herein, the child rows may be associated with a parent row by using an expression that represents a matching definition associated with that parent row and that receives as input a foreign key of the child row to determine if the association should be made between the corresponding child table row and the corresponding parent table row.

In such a manner, the principles described herein link the child table 210 to a parent table 220, and such linking is represented within the association index 230. The database environment 200 also includes a linking module 240 to generate the association index 230. Furthermore, a re-evaluation module 250 re-evaluates and revises the record associations within the association index in response to changes to a child table and/or the parent table.

Figure 3:
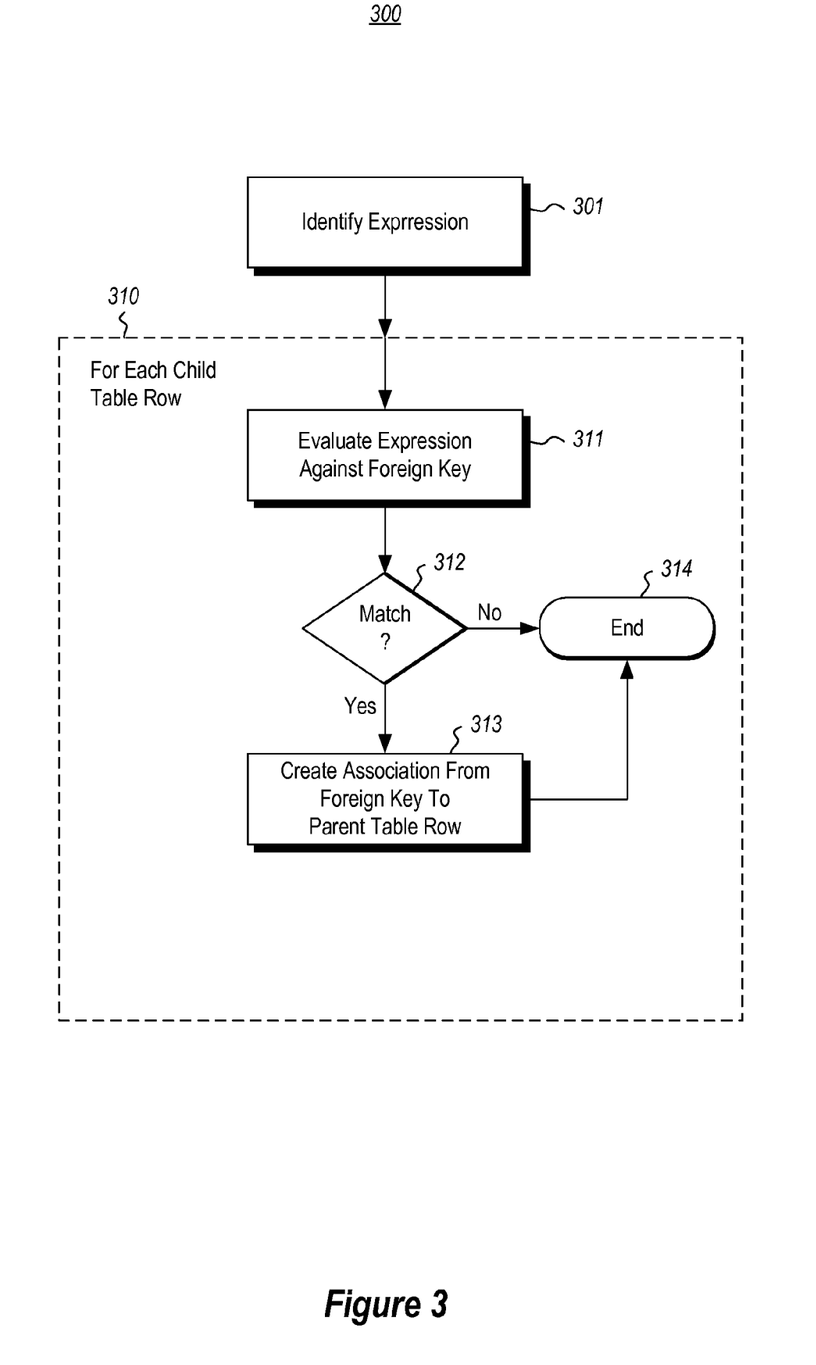
FIG. 3 illustrates a flowchart of a method for creating an association index that records associations between one or more child tables and a parent table in a database system using a foreign key field in the child table.

FIG. 3 illustrates a flowchart of a method 300 for creating an association index that records associations between one or more child tables and a parent table in a database system using a foreign key field in the child table. As the method 300 may be performed within the database system 200 of FIG. 2, the method 300 will now be described with frequent reference to FIG. 2. The method 300 may be performed by, for instance, a computing system (such as computing system 100) by one or more processors of the computing system (e.g., processors 102) executing one or more computer-executable instructions. In the example of FIG. 2, or instance, the method 300 is performed by the linking module 240. In fact, the linking module 240 repeats method 300 for each row in the parent table.

For each parent table row, the method 300 involves identifying an expression (act 301). The expression is used for each row in the child table to determine whether the child table row is to be associated with the parent table row. To make the determination for each child table row with respect to a given parent table row, the expression takes as input the foreign key of the child table row one or more fields of the parent table row.

For instance, in the context of FIG. 2, the expression associated with the parent table row 221A is identified, and the foreign key of the child table row 211A and one or more values of the parent table row 221A would be provided as input to the expression to evaluation whether there is a match. Similarly, the foreign key of the child table row 211B and one or more values of the parent table row 221A would be provided as input to the expression to evaluate whether there is a match. Also, the foreign key of the child table row 211C and one or more values of the parent table row 221A would be provided as input to the expression to evaluate whether there is a match. Finally, at least with respect to the parent table row 221A and the illustrated child table rows 211A through 211D, the foreign key of the child table row 211D and one or more values of the parent table row 221A would be provided as input to the expression to evaluate whether there is a match. Similarly, each of the child table rows 211A through 211D would be evaluated against the expression for the parent table row 211B. Also, each of the child table rows 211A through 211D would be evaluated against the expression for the parent table row 211C.

Conventionally, expressions defining an association between a foreign key and a parent table row are simply based on an equality to the primary key, and is the same for all rows in the parent table. For instance, if the foreign key for a given child table row is the same as the primary key for any of the parent table rows, then an association would be made between the foreign key of the child table row and the matching parent table row. In the case of text, the expression may be a "contains" expression. That is, if the foreign key (in the form of text) for a given child table row contains the text of the primary key for any of the parent table row, then an association would be made between the foreign key of the child table row and the matching parent table row.

In contrast, in accordance with the principles described herein, an expression may be any expression, including semantic expressions, and can use values from the parent table row other than the primary key. Furthermore, while not required, the expression may differ by parent table row. Accordingly, row based expressions of association criteria are enabled herein. In this description and in the claims, a "semantic expression" is an expression that semantically describes one or more association criteria, and an equals or contains criteria expressly falls outside of the definition of "semantic expression".

Figure 4:
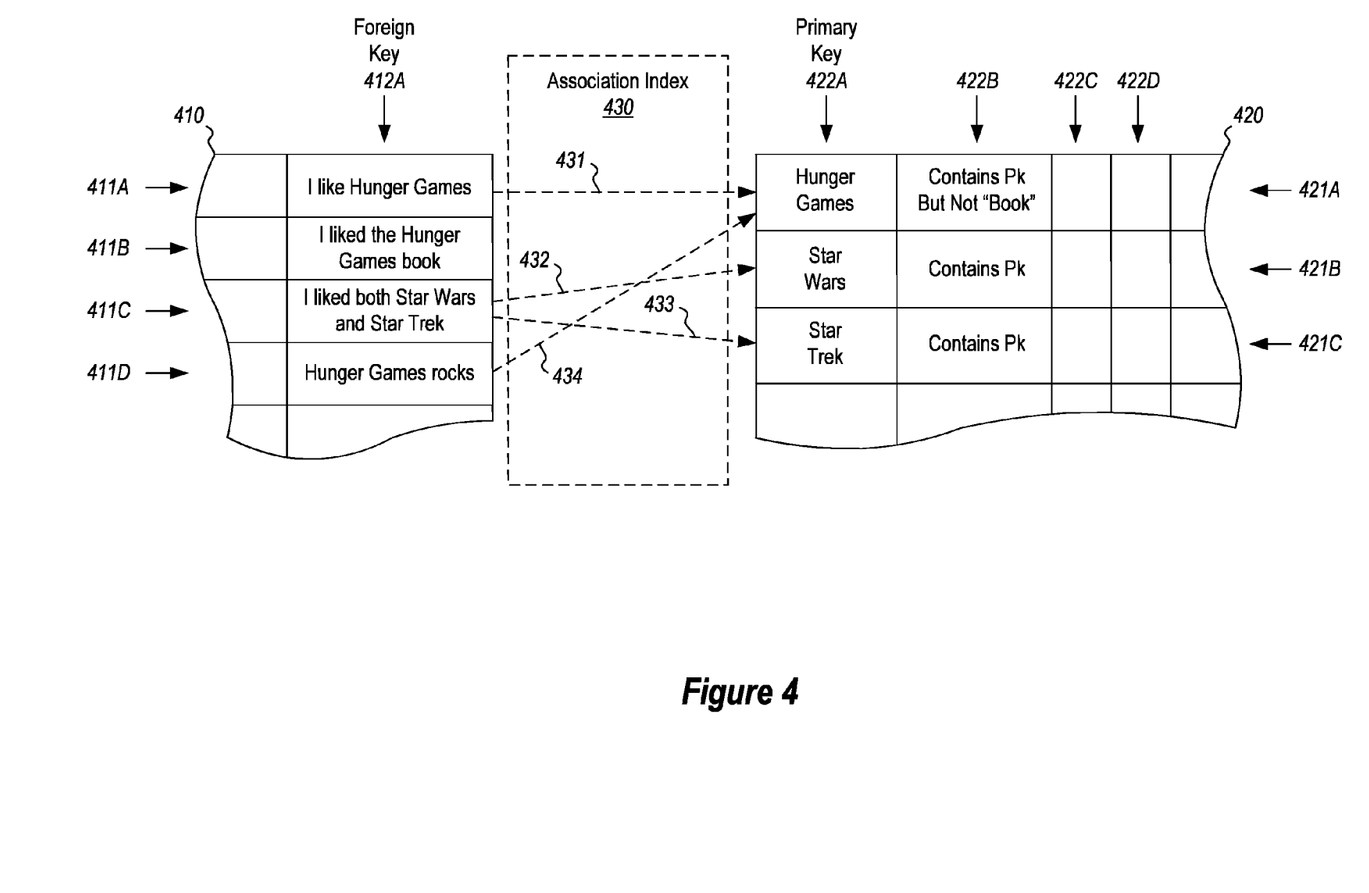
FIG. 4 illustrates an example database system in which there is a tweet child table and a movies parent table.

For instance, as an example, a semantic expression includes a component expression, a ranged expression, a set expression, or the like. For instance, FIG. 4 illustrates an example database system 400 in which there is a tweet child table 410 and a movies parent table 420. The tweet child table 410 includes a foreign key column 412A that lists various tweets made. The movie parent table 420 includes a primary key column 422A that lists various movies. In this case, the expression for each parent table row is identified included within (and identified by referencing) the expressions column 422B. The expression for parent table row 421A (i.e., contains [Primary Key] but not "Book") is a compound semantic expression, and is different than the expressions of the remaining parent table rows 421B and 421C (which is contains [Primary Key]).

The method 300 of FIG. 3 will now be described with respect to the example database system 400 of FIG. 4. The content of dashed-lined box 310 may be performed for each child table row. Accordingly, the contents of dashed-lined box 310 are performed for the tweet "I like Hunger Games" in child table row 411A. The tweet "I like Hunger Games" is then evaluated against the expression "Contains 'Hunger Games', but not 'book'" (act 311). It is match ("Yes" in decision block 312), and thus an association 431 is identified (act 313) between the foreign key "I like Hunger Games" and the parent table row 421A that contains the movie primary key "Hunger Games". This is because the tweet "I like Hunger Games" contains the term "Hunger Games" (the primary key), but does not contain the term "Book", and is thus a match to the expression in the expression field 422B of the corresponding parent table row 421A. The association 431 is further recorded in the association index (act 314) as represented by the association 431 passing through box 430. Thus, the box 430 represents an association index 430.

The contents of dashed-lined box 310 are also performed for the tweet "I liked the Hunger Games book" in child table row 411B. The tweet "I liked the Hunger Games book" is then evaluated against the expression "Contains 'Hunger Games', but not 'book'" (act 311). It is not a match ("No" in decision block 312) because the tweet contains the term "book". Accordingly, no further evaluation (act 315) of the child table row 411B need be performed with respect to the parent table row 421A.

The contents of dashed-lined box 310 are also performed for the tweet "I liked both Star Wars and Star Trek" in child table row 411C, which is evaluated against the expression "Contains 'Hunger Games', but not 'Book'". It is not a match ("No" in decision block 312). Accordingly, no further evaluation (act 315) of the child table row 411C need be performed with respect to the parent table row 421A.

The contents of dashed-lined box 310 are also performed for the tweet "Hunger Games rocks" in child table row 411D, which is evaluated against the expression "Contains 'Hunger Games', but not 'Book'". It is a match ("Yes" in decision block 312), and thus an association 434 is identified (act 313) between the foreign key "Hunger Games rocks" and the parent table row 421A. This is because the tweet "I like Hunger Games" contains the term "Hunger Games" (the primary key), but does not contain the term "Book", and is thus a match to the expression in the expression field 422B of the corresponding primary row field 421A. The association 434 is further recorded in the association index (act 314) as represented by the association 434 passing through box 430.

The method 300 may proceed in this fashion one parent row at a time, completing the association index 330 in a single pass of the parent table. For instance, the method 300 is also performed with respect to the parent table row 421B is a similar manner. The contents of dashed-lined box 310 are thus performed for the tweet "I like Hunger Games" in child table row 411A. The tweet "I like Hunger Games" is evaluated against the expression "Contains 'Star Wars'" (act 311). It is not a match ("No" in decision block 312), and thus no association is identified or recorded.

The tweet "I liked the Hunger Games book" is then evaluated against the expression "Contains 'Star Wars'" (act 311). It is also not a match ("No" in decision block 312), and thus no association is identified or recorded.

The tweet "I like both Star Wars and Star Trek" is then evaluated against the expression "Contains 'Star Wars'" (act 311). It is a match ("Yes" in decision block 312). Accordingly, association 432 is identified (act 313) between the tweet "I liked both Star Wars and Star Trek" and the parent table row 421B that has the movie primary key "Star Wars". The association 432 is further recorded in the association index (act 314) as represented by the association 432 passing through box 430.

The tweet "Hunger Games rocks" is then evaluated against the expression "Contains 'Star Wars'" (act 311). It is not a match ("No" in decision block 312), and thus no association is made.

The method 300 is also performed with respect to the parent table row 421C is a similar manner. The contents of dashed-lined box 310 are thus performed for the tweet "I like Hunger Games" in child table row 411A. The tweet "I like Hunger Games" is evaluated against the expression "Contains 'Star Trek;'" (act 311). It is not a match ("No" in decision block 312).

The tweet "I liked the Hunger Games book" is then evaluated against the expression "Contains 'Star Trek'" (act 311). It is also not a match ("No" in decision block 312), and thus no association is made.

The tweet "I like both Star Wars and Star Trek" is then evaluated against the expression "Contains 'Star Trek'" (act 311). It is a match ("Yes" in decision block 312). Accordingly, association 433 is identified (act 313) between the tweet "I liked both Star Wars and Star Trek" and the parent table row 421B that has the movie primary key "Star Wars". The association 433 is further recorded in the association index (act 314) as represented by the association 433 passing through box 430.

Figure 5:
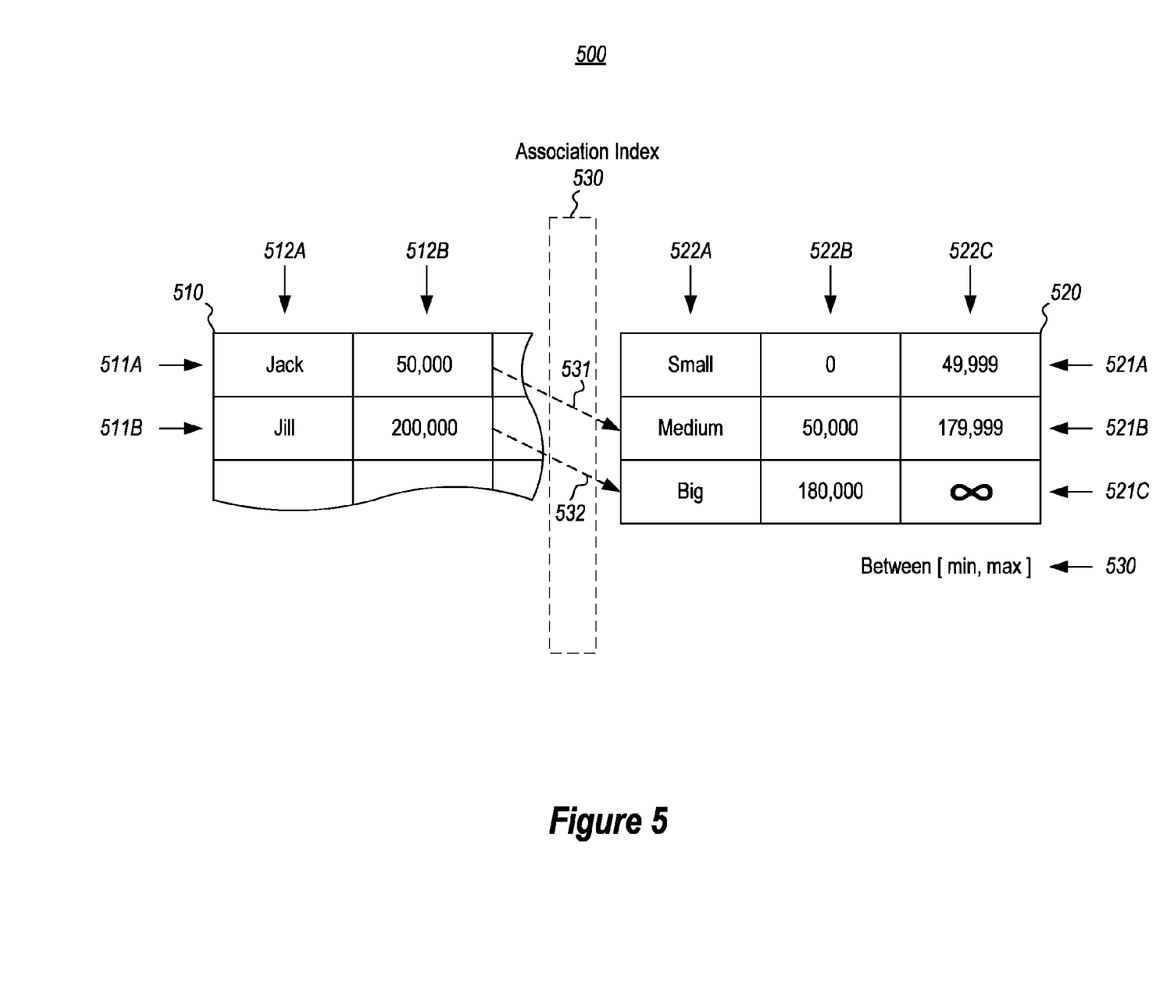
FIG. 5 illustrates an example database system in which there is an employee child table and a salary range parent table.

A second example is illustrated in FIG. 5, which illustrates an example database system 500 in which there is an employee child table 510 and a salary range parent table 520. In the child table 510, there is a name column 512A and a salary column 512B. The salary column 512 serves as the primary key column. In this case, the expression 521 for each parent table row is the same, but is a complex expression, and uses fields other than the primary key field as an input to the expression. In particular, the expression 521 indicates that if the foreign key is between the value in the minimum column 522B and the maximum column 522C for the respective parent table row, then the foreign key will be associated with the corresponding parent table row.

The method 300 of FIG. 3 will now be described with respect to the example database system 500 of FIG. 5. The method 300 is performed with respect to the parent table row 521A having the primary key Small. The content of dashed-lined box 310 may be performed for each of child table row 511A and 511B. In each case, however, the salary is not within 0 and 49,000 ("No" in decision block 312), and thus there are no associations made in this performance of method 300.

The method 300 is also performed with respect to the parent table row 521B having the primary key Medium. Here the foreign key 50,000 for child table row 511A matches (it is between 50,000 and 179,999, inclusive) ("Yes" in decision block 312), and thus association 531 is identified (act 313) between the foreign key 50,000 of child table row 511A and the parent table row 521B. Furthermore, the association 531 is further recorded in the association index (act 314) as represented by the association 531 passing through box 530. Again, the box 530 represents an association index 530.

As for child table row 511B, the value 200,000 is not between 50,000 and 179,999 ("No" in decision block 312), and thus no association is made (act 314).

The method 300 is also performed with respect to the parent table row 521C having the primary key High. Here the foreign key 50,000 for child table row 511A is not 180,000 or greater ("No" in decision block 312), and thus no association is identified. However, the foreign key 200,000 for child table row 511B is greater than 180,000 ("Yes" in decision block 312), and thus association 532 is identified (act 313) between the foreign key 200,000 of child table row 511B and the parent table row 521C. The association 532 is further recorded in the association index (act 314) as represented by the association 532 passing through box 530. In this case, the expression was a ranged expression. A set expression is a case in which the foreign key is evaluated to determine if it is one of a number of values.

Figure 6:
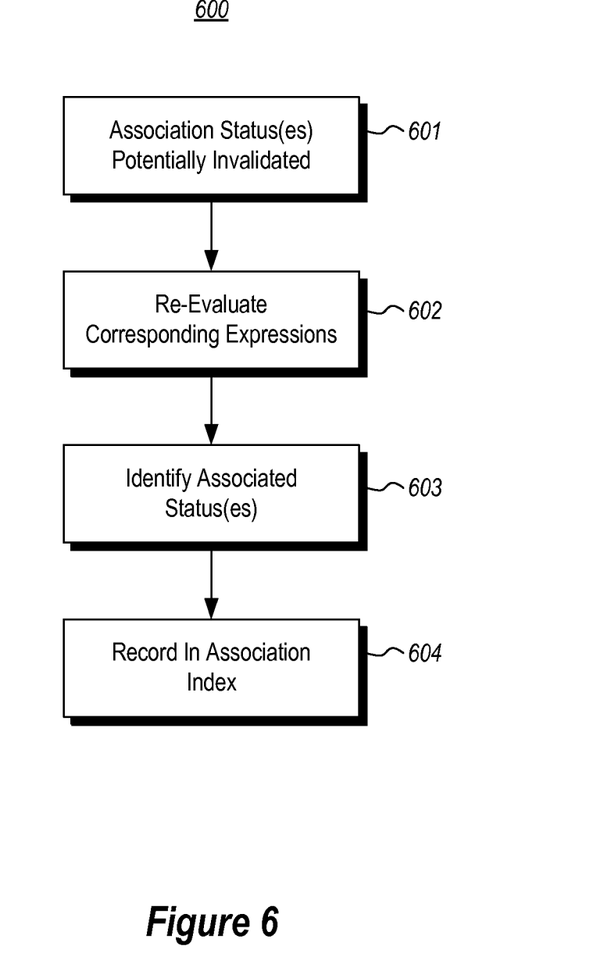
FIG. 6 illustrates a flowchart of a method for updating an association index that defines a linking of one or more child tables to a parent table in a database system.

FIG. 6 illustrates a flowchart of a method 600 for updating an association index that defines a linking of one or more child tables to a parent table in a database system. For instance, the method 600 may be performed in order to update the association index 230 of FIG. 2, the association index 430 of FIG. 4, and/or the association index 530 of FIG. 3. As an example, the method 600 may be performed by the re-evaluation module 250 of FIG. 2.

The method is initiated upon determining that one or more of the association statuses have been potentially invalidated (act 601). For instance, one or more of the association statuses within the association index 230 may be potentially invalidated due to a change in a child table (such as child table 210) or the parent table 220. Likewise, one or more of the association statuses within the association index 430 may be potentially invalidated due to a change in the child table 410 or the parent table 420. Furthermore, one or more of the association statuses within the association index 530 may be potentially invalidated due to a change in the child table 510 or the parent table 520.

The association status might be an indication that there is an association between a particular child table row and a particular parent table row, or an indication that there is not an association between a particular child table row and a particular parent table row. Furthermore, the indication within the association index might be an explicit indication, or an implicit indication. As an example, an association index might only expressly represent positive association statuses where an association has been found between child table rows and parent table rows. In that case, it is left implicit (but still indicated) that there are negative association statuses wherein an association has not been found between a child table row and a parent table row. This is implicit in this case based on the lack of an expressed positive association status.

The method is initiated when an association status has been determined to be potentially invalidated (act 601). For instance, due to some change, a negative association status may no longer be correct, or a positive association status may no longer be correct. This may be due to, for example, a child table row changing. For instance, a foreign key within a child table row might have changed. This now potentially invalidates any association previously made or denied based on mapping definitions that use the unchanged or altered foreign key as input.

When an association status has been determined to be potentially invalidated (act 601), the mapping definition that was used to originally create the now potentially invalidated association is re-evaluated (act 602). This is done without re-evaluating at least some of the mapping definitions that were used to create association statuses that have not been invalidated. The new association statuses are thus identified (act 603). The association index is then revised (act 604) to reflect the result of the re-evaluation and thus the new association statuses.

Figure 7:
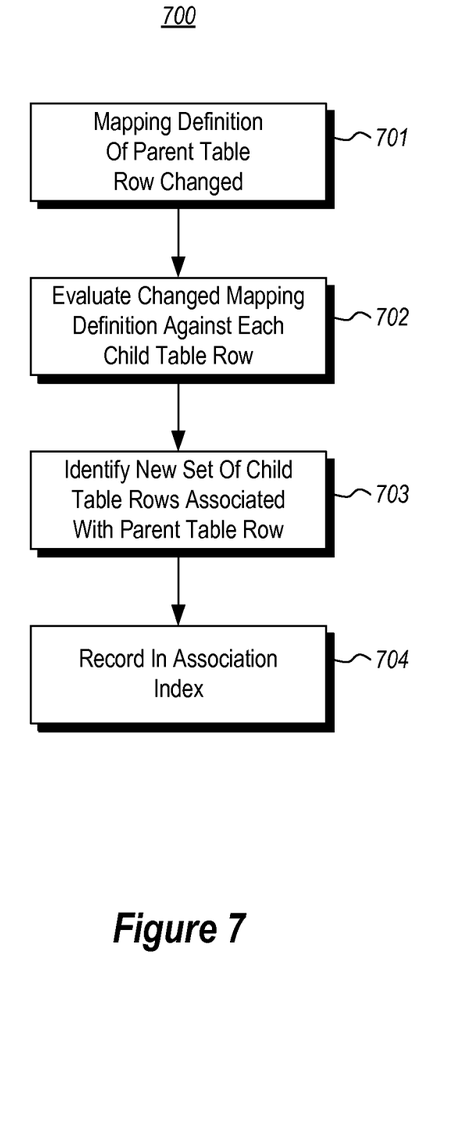
FIG. 7 illustrates a flowchart of a method for modifying the association index when a mapping definition of a particular parent table row has changed.

For instance, FIG. 7 illustrates a flowchart of a method 700 for modifying the association index when a mapping definition of a particular parent table row has changed (act 701). That is one of the changes that can cause serious doubt as to any association statuses that had previously been decided for that parent table row. Accordingly, act 701 is an example that may cause the re-evaluation module to determine that association statuses have been potentially invalidated (act 601).

For instance, in FIG. 4, suppose that the expression in expression column 422B of row 421A is changed from "Contains Pk, But Not 'Book'" to "Contains Pk". In the generally case, this calls into question any associations or lack of associations between any of the child table rows 411A through 411D and the parent table row 421A. For instance, this change calls into question the associations 431 and 434, and also calls into question the decision not to associate child table rows 411B and 411C with the parent table row 421A.

In response, the re-evaluation module evaluates the changed mapping definition (act 702, which is an example of act 602). In the general case, this re-evaluation may be performed with respect to each child table row of the child table 410 and any other child tables, if any. However, the association index 430 might also include reason(s) why associations were previously made and/or why associations were not made with respect to child table rows and a particular parent table row. In that case, the re-evaluation module may perform the re-evaluation of act 702 by determining whether the reason still stands, and if so, skip formal re-reevaluation of the revised mapping definition with respect to that child row.

From the re-evaluation (act 702), the re-evaluation module identifies a new set of one or more child table rows that are associated with the particular parent table row (act 703—which is an example of act 603). For instance, in the example of FIG. 4, in which the mapping definition of parent table row 421A is changed from "Contains Pk, But Not 'Book'" to "Contains Pk". In response, the associations 431 and 434 are re-affirmed. However, a new association (not shown) is made between the child table row 411B and the parent table row 421A. In the general case, the re-evaluation of the altered mapping expression may be performed with respect to each child table row. However, there are potential optimizations that the re-evaluation module could make based on the nature of the alterations.

For instance, in this case, the expression is modified by simply removing a restriction. This means that the expression is more expansive, and thus no prior associations will be invalidated. Instead, the re-evaluation module may evaluate just those child rows that did not previously have an association with that parent table row 421A. As a further optimization, if the reason for a prior lack of association is logged in the association index 430, then perhaps the fact that the association with the parent table row 421A was not made solely because the foreign key of the child table row contained the word "Book" would be recorded. In that case, no formal evaluation of the altered mapping definition need be made at all with respect to the child table rows. Instead, the re-evaluation (act 702) may simply involve noting that the recorded restriction has been removed.

However the associations of the new set of one or more child table rows is made with respect to the particular parent table row, that association is then recorded in the association index (act 704—which is an example of the act 604). For instance, with respect to FIG. 4, the associations 431 and 434 remain recorded, whilst another association (not shown) is formulated between the child table row 411B and the parent table row 421A.

Figure 8:
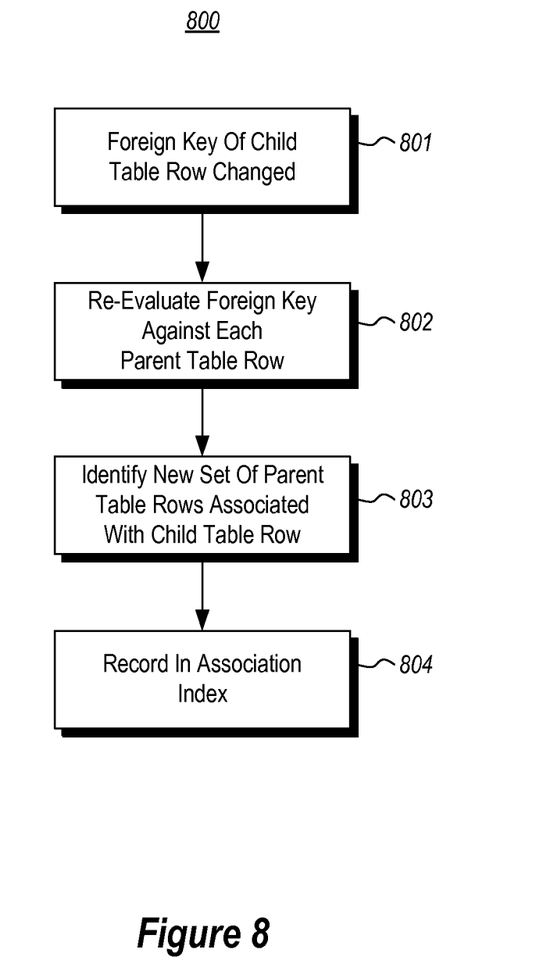
FIG. 8 illustrates a flowchart of a method for modifying an association index when a foreign key of a particular child row has changed.

FIG. 8 illustrates a flowchart of a method 800 for modifying an association index when a foreign key of a particular child row has changed (act 801). Again, that is one of the changes that can again cause serious doubt as to any association statuses that had previously been decided for that child table row. Accordingly, act 801 is an example that may cause the re-evaluation module to determine that association statuses have been potentially invalidated.

For instance, in FIG. 4, suppose that the foreign key in column 412A of row 411A is changed from "I like Hunger Games" to "I like Start Wars". In the generally case, this calls into question any associations or lack of associations between the child table row 411A and any of the parent table rows 421A through 421C. For instance, this change calls into question the associations 431, and also calls into question the decision not to associate child table rows 411A with either of the parent table rows 421B and 421C.

In response, the re-evaluation module may evaluate all of the matching definitions of all of the parent table rows against the particular child table row (act 802, which is an example of act 602). In the general case, this re-evaluation may be performed with respect to every parent table row. However, again, there might be optimizations performed. Again, if the association index 430 might still include reason(s) why associations were previously made and/or why associations were not made with respect to a particular child table row and the particular parent table row. In that case, the re-evaluation module may perform the re-evaluation of act 802 by determining whether the reason still stands, and if so, skip formal re-evaluation of the revised foreign key against particular parent table rows.

For instance, if the parent table row simply does not receive the revised foreign key as an input, then any association previously made between the particular child table row with the revised foreign key and that particular parent table row may be invalidated. If the parent table row does receive the revised foreign key as input, then any previous lack of association between the particular child table row and that parent table row is in doubt, and the mapping definition of the parent table row may be re-evaluated to determine if there should now be an association with that child table row.

From the re-evaluation (act 802), the re-evaluation module identifies a new set of one or more parent table rows that are associated with the particular child table row (act 803—which is an example of act 603). For instance, in the example of FIG. 4, in which the foreign key of child table row 411A is changed from "I like Hunger Games" to "I like Star Wars". In response, the association 431 is removed. In addition, an association (not shown) is made between the child table row 211A and the parent table row 221B.

However the associations of the new set of one or more parent table rows is made with respect to the particular child table row, that association is then recorded in the association index (act 804—which is an example of the act 604). For instance, with respect to FIG. 4, the association 431 is deleted from the association index, and a new association is recorded between child table row 411A and parent table row 421B.

Note that when a child table row is added to a child table row, the method 800 may likewise be performed as described in order to identify which parent table rows map to the additional child table row. Again, the addition of the child table row did not necessitate rebuilding the entire association index.

Accordingly, the principles described herein may be performed to automatically associate foreign keys of child table rows in a database with parent table rows in the database. Furthermore, the association may be made and recorded in an association index within a single pass of the parent table.

Furthermore, associations may be revised automatically and without re-evaluating the entire parent table, thereby allowing revision of the association table to occur quickly and with improved utilization of computing resources. This further allows more real-time updating of the association index as changes are made to the database.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-readable hardware storage devices having thereon computer-executable instructions that are structured such that, when executed by one or more processors of a computing system, cause the computing system to update an association index that defines a linking of a child table to a parent table in a database system using a foreign key in the child table, by at least performing the following:
   obtaining, at the database system, an association index representing a plurality of association statuses linking the parent table and the child table, the association index being constructed by performing the following for each of a plurality of parent table rows of the parent table:
      identifying, at the database system, a compound semantic expression included in the corresponding parent table row, the compound semantic expression defining a mapping definition that uses as input, (i) a first foreign key from the child table comprising a selection of text imported from a data source external to the database system, and (ii) a second foreign key from the parent table, the compound semantic expression excluding any expression containing only a direct equality expression or only a contains expression;
      evaluating, at the database system, the mapping definition to identify a child table row that maps to the corresponding parent table row; and
      recording, at the database system, a linking of the mapped child table row to the corresponding parent table row in the association index; and
   determining, at the database system, that at least one of the child table or the parent table has changed in a manner that one of the association statuses in the association index is potentially invalid;
   in response to the determining, re-evaluating, at the database system, at least one mapping definition that was used to create the potentially invalid association status; and
   revising, at the database system, the association index to reflect a result of the re-evaluation.

2. The computer program product in accordance with claim 1, the re-evaluating occurring without re-evaluating at least some of the mapping definitions that were used to create association statuses that have not been potentially invalidated by the change in the one or more child tables or the parent table.

3. The computer program product in accordance with claim 1, determining that one or more of the plurality of associations having been potentially invalidated comprising:
   determining that a mapping definition of a particular parent table row has changed; and
   in response to determining that the mapping definition of the particular parent table row has changed, determining that at least one association status between a child table row and the particular parent table row is potentially invalid.

4. The computer program product in accordance with claim 3, further comprising the following in response to determining that the mapping definition of the particular parent table row has changed:
   evaluating the changed mapping definition; and
   determining whether the potentially invalidated association remains valid.

5. The computer program product in accordance with claim 4, further comprising the following in response to evaluating the changed mapping definition:
   identifying a new set of one or more child table rows that are associated with the particular parent table row; and
   recording the association of the new set of one or more child table rows with the particular parent table row in the association index.

6. The computer program product in accordance with claim 1, the determining that one or more of the plurality of association statuses have been potentially invalidated comprising:
   determining that a foreign key of a particular child row has changed.

7. The computer program product in accordance with claim 6, the method further comprising the following in response to the determining that the foreign key of the particular child table row has changed:
   determining that an association between the particular child table row and a particular parent table should be made, the particular parent table row having a corresponding mapping definition that depended on the unchanged form of the foreign key has been potentially invalidated.

8. The computer program product in accordance with claim 6, the method further comprising the following in response to the determining that the foreign key of the particular row has changed:
   identifying a set of one or more parent table rows that each have a mapping definition that depends on the unchanged form of the foreign key; and
   determining that an association status between the particular child row and at least some of the identified set of one or more parent table rows has been potentially invalidated.

9. The computer program product in accordance with claim 6, the method further comprising the following in response to the act of determining that the foreign key of the particular row has changed:
   identifying a set of one or more parent table rows that each have a mapping definition that depends on the changed form of the foreign key;
   for at least one of the identified set of one or more parent table rows, evaluating the mapping definition of the corresponding parent table row to determine whether an association should be made with the particular child table row.

10. The computer program product of claim 1, wherein the data source external to the database system is a social media platform and the selection of text imported from the social media platform is a user posting.

11. A method for updating an association index that defines a linking of a child table to a parent table in a database system using a foreign key in the child table, the method comprising:

obtaining, at the database system, an association index representing a plurality of associations between the parent table and the child table, the association index being constructed by performing the following for each of a plurality of parent table rows of the parent table:
    identifying, at the database system, a compound semantic expression included the corresponding parent table row, the compound semantic expression defining a mapping definition that uses as input, (i) a first foreign key from the child table comprising a selection of text originating from a data source external to the database system, and (ii) a second foreign key from the parent table, the compound semantic expression excluding any expression containing only a direct equality expression or only a contains expression;
    evaluating, at the database system, the mapping definition to identify a child table row that maps to the corresponding row parent table row; and
    recording, at the database system, a linking of the mapped child table row to the corresponding parent table row in the association index; and
    determining, at the database system, that an association status has been potentially invalidated through change to at least one of the child table or the parent table;
in response to determining that an association status has been potentially invalidated, re-evaluating, at the database system, the mapping definition that was used to create the association status that has been potentially invalidated, without re-evaluating at least some of the mapping definitions that were used to create associations that have not been potentially invalidated; and
revising, at the database system, the association index to reflect a result of the re-evaluation.

12. The method in accordance with claim 11, the determining that one or more of the plurality of association statuses having been potentially invalidated comprising:
    determining that a mapping definition of a particular parent table row has changed.

13. The method in accordance with claim 12, further comprising the following in response to determining that the mapping definition of the particular parent table row has changed:
    evaluating the changed mapping definition.

14. The method in accordance with claim 13, further comprising the following in response to evaluating the changed mapping definition:
    identifying a new set of one or more child table rows that are to be associated with the particular parent table row; and
    recording the association of the new set of one or more child table row with the particular parent table row in the association index.

15. The method in accordance with claim 13, wherein the identifying of the new set of one or more child table rows results in at least one association between a child table row and the particular parent table row being invalidated within the association index.

16. The method in accordance with claim 11, the determining that one or more of the plurality of association statuses have been potentially invalidated comprising:
    determining that a foreign key of a particular child row has changed.

17. The method in accordance with claim 16, further comprising the following in response to the act of determining that the foreign key of the particular row has changed:
    identifying a set of one or more parent table rows that each have a mapping definition that depends on the unchanged form of the foreign key; and
    determining that an association status between the particular child row and at least some of the identified set of one or more parent table rows has been potentially invalidated.

18. The method in accordance with claim 16, further comprising the following in response to determining that the foreign key of the particular row has changed:
    identifying a set of one or more parent table rows that each have a mapping definition that depends on the changed for of the foreign key;
    for at least one of the identified set of one or more parent table rows, evaluating the mapping definition of the corresponding parent table row to determine whether an association should be made with the particular child table row.

19. The method in accordance with claim 11, wherein determining that the foreign key of the particular row has changed comprises:
    determining that a new child table row has been added, the child table row including the foreign key.

20. A computing system comprising:
one or more processors; and
one or more computer-readable storage devices including executable instructions stored thereon that, when executed by the one or more processors, are configured for maintaining one or more child tables and an association index representing a plurality of association statuses linking a parent table to the one or more child table, the computing system being configured to construct and maintain the association index including performing the following for each of a plurality of parent table rows of the parent table:
    identifying, at the one or more processors, a compound semantic expression included in the corresponding parent table row, the compound semantic expression defining a mapping definition that uses as input, (i) a first foreign key from the child table comprising a selection of text originating from a data source external to the database system, and (ii) a second foreign key from the parent table, the compound semantic expression excluding any expression containing only a direct equality expression or only a contains expression;
    evaluating, at the one or more processors, the mapping definition to identify a child table row that maps to the corresponding parent table row;
    recording, at the one or more processors, a linking of the mapped child table row to the corresponding parent table row in the association index;
    determining, at the one or more processors, that at least one of the child table or the parent table has changed in a manner that one of the association statuses in the association index is potentially invalid;
    in response to the determining, re-evaluating, at the one or more processors, at least one mapping definition that was used to create the potentially invalid association status; and
    revising, at the one or more processors, the association index to reflect a result of the re-evaluation.

* * * * *